Figures 7, 8:
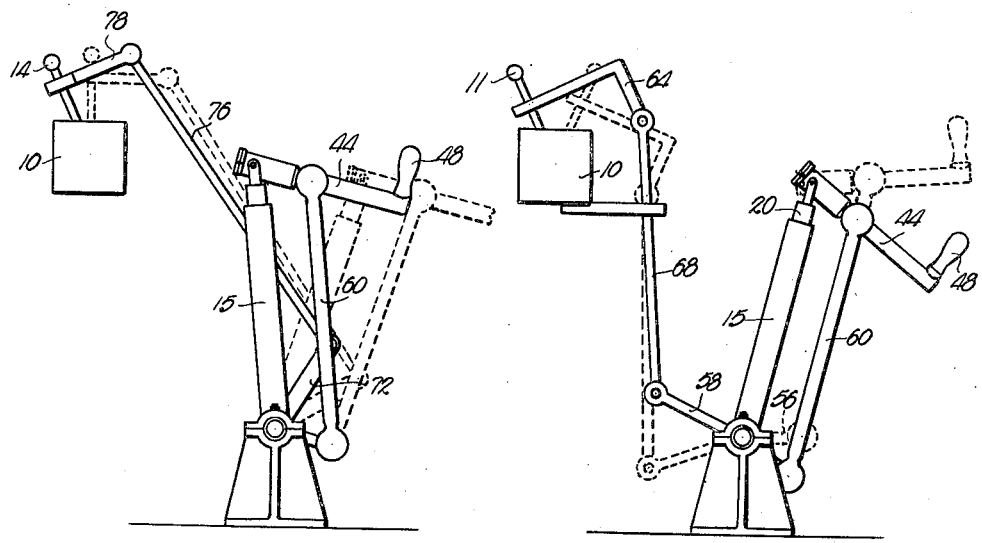

April 24, 1951      B. H. HESEMANN      2,549,969
MANUAL CONTROL DEVICE
Filed Oct. 13, 1947      3 Sheets-Sheet 1
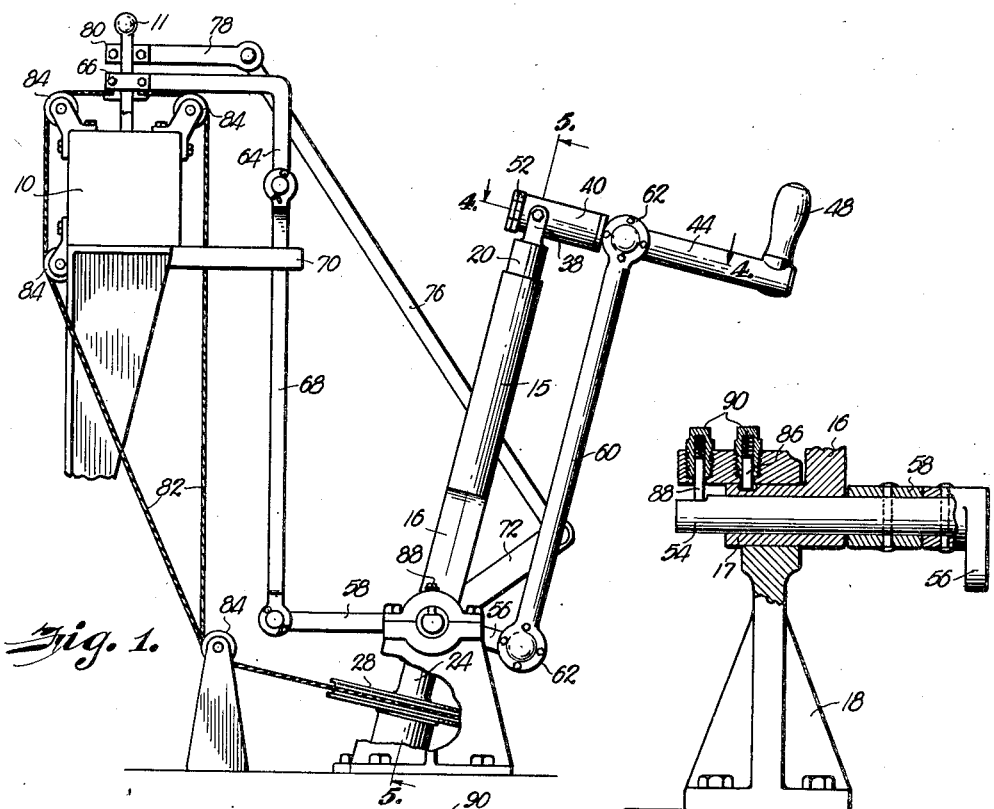
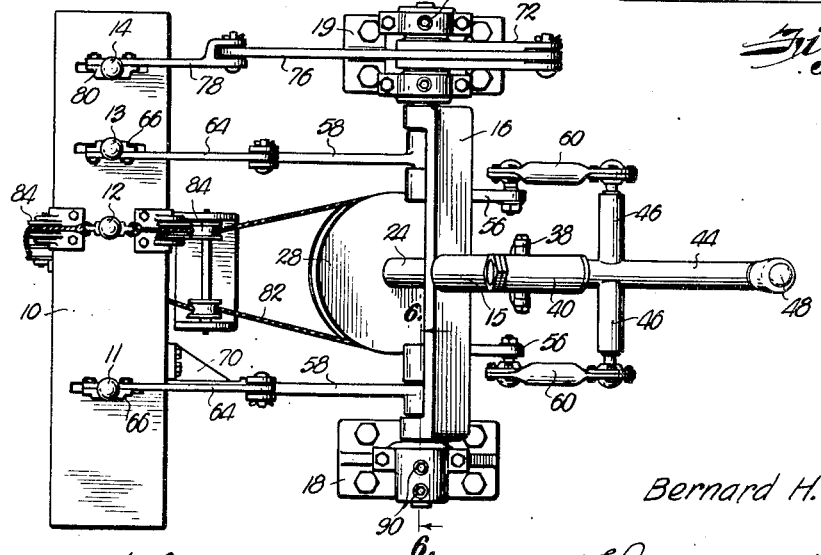
Inventor
Bernard H. Hesemann
By Thos. E. Acqfield
Attorney

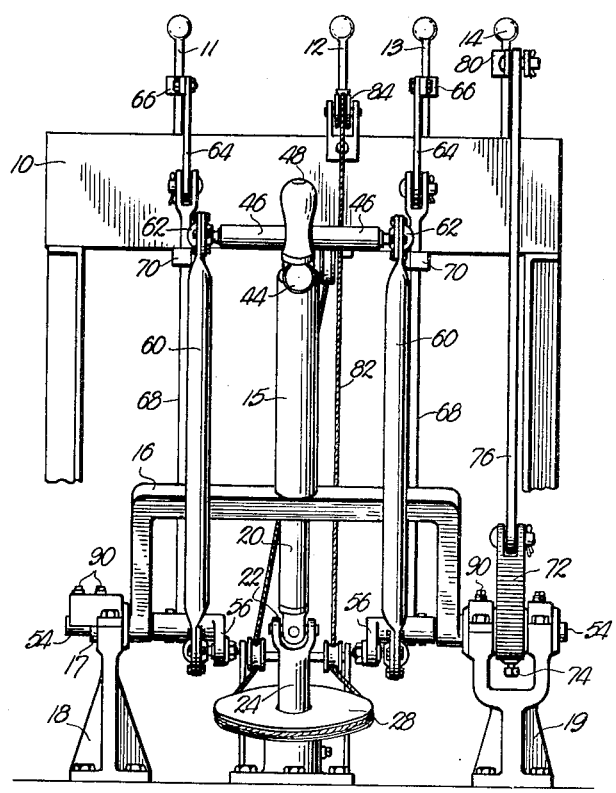

April 24, 1951  B. H. HESEMANN  2,549,969
MANUAL CONTROL DEVICE
Filed Oct. 13, 1947  3 Sheets-Sheet 3

Inventor
Bernard H. Hesemann
By Thos. E. Sufield
Attorney

Patented Apr. 24, 1951

2,549,969

UNITED STATES PATENT OFFICE 2,549,969

MANUAL CONTROL DEVICE

Bernard H. Hesemann, Orleans, Nebr.

Application October 13, 1947, Serial No. 779,533

16 Claims. (Cl. 74—471)

The proposed invention relates in general to manual control devices and it deals more particularly with mechanism selectively operable with one hand to produce a plurality of diversified results individually or in any desired combination.

Apparatus of this character finds utility in commercial and industrial fields wherever there are separate control operations to be performed which could advantageously be coordinated or centralized in a single control instrument. For example, road grading machinery, automotive equipment, drag line apparatus, cranes, hoists, winches, mixers, pumps, dump trucks, welding positioners and the like, all require an operator to exercise a variety of controls, sometimes in succession and other times together; to do the necessary things for efficient operation frequently requires him to use both hands, shifting them rapidly from one control device to another, and it is not unusual for both hands to be fully occupied at a time when the need for performing some further control operation arises, this being physically impossible in view of the layout of controls.

Even where a diversified system of controls would be satisfactory for normal use it often is unsatisfactory for a person who is handicapped by the lack of one hand or who lacks the use of his legs. In such cases the need for a simplified system of control is obvious.

With the above facts in mind it is the general object of the invention to provide a device mechanically linked to a number of control members whereby the members can be operated singly or in any desired sequence or grouping by movements of the device.

Another object is to provide a device capable of being moved in different directions from a normal or neutral position and also capable of being moved in different directions from any off-normal position in order to select and operate different control members.

According to one feature of the invention the direction of movement selects the member or members to be actuated while the distance of movement governs the extent or degree to which the selected members are actuated.

Another feature resides in the fact that there are intersecting paths along each of which my device can be moved without influencing some particular control member while it is adjusting some other member or members, and it is an object of the invention to provide means for automatically indexing the device with respect to these paths in order to facilitate its return to them from off-normal positions as well as to resist accidental deviation of the displacement of the device from any path.

Other objects and features will appear in the course of the following description of the invention.

In the accompanying drawings which form a part of the specification and are to be read in conjunction therewith, and in which like reference numerals are employed to indicate like parts of the various views, Fig. 1 is a side elevational view of my control device, part being broken away for purposes of illustration, Fig. 2 is a plan view of the device, Fig. 3 is a front elevational view of the device, Fig. 4 is an enlarged cross sectional view taken along the line 4—4 of Fig. 1 in the direction of the arrows, Fig. 5 is an enlarged cross sectional view taken along the line 5—5 of Fig. 1 in the direction of the arrows, Fig. 6 is an enlarged cross sectional view taken along the line 6—6 of Fig. 2 in the direction of the arrows, and Figs. 7 to 10 are diagrammatic views illustrating the various primary movements or controls possible with my device.

Referring more particularly to the drawings the reference numeral 10 identifies a control panel having four separate control levers 11, 12, 13 and 14 which customarily are operated individually and selectively by hand. The apparatus controlled by these levers forms no part of the present invention; however, for purposes of explanation it can be assumed to be a road grading machine having among other things a scraper blade, the left side of which is raised and lowered by moving lever 11 forward and backward while the right side of the blade is similarly controlled by lever 13. It will be assumed that lever 12 swings the blade to the right or left in a horizontal plane, and that lever 14 raises and lowers the scarifier on the grader.

In controlling machinery of this type compound movements frequently are designed which necessitate the operation of several control levers together or in overlapping periods, and it will be appreciated that the operator must employ both hands with considerable dexterity in order to handle the apparatus with maximum efficiency. For instance, levers 11 and 13 sometimes are pushed forward simultaneously in order to elevate the scraper blade without changing its pitch; similarly, they sometimes are drawn back together to lower the blade as a unit. Again, lever 11 may be pushed forward while lever 13 is drawn back, or vice versa, in order to adjust the pitch of the blade to the slopes of the road. Concurrently with these operations it may be necessary to swing the blade by moving handle 12 or change the elevation of the scarifier by moving handle 14.

By means of my invention the control of the various levers is coordinated and centralized in a single device capable of various movements to bring about any or all of the desired operations, whereby only one hand is needed to accomplish the same results that formerly required the use of two hands. My control device has a main lever or column comprising a hollow tube 15 welded at its lower end to an inverted U-shaped rocker 16, the rocker having hollow trunnions 17 journaled in the supports 18 and 19 as shown, so that the lever is adapted to pivot forward and backward in a vertical plane.

Within the tube 15 is a rotary shaft 20 connected at its lower end by a universal joint 22 to the stub shaft 24. The latter is rotatably mounted in an inclined support bearing 26 and has a pulley 28 fixed thereon to rotate with the shaft. The stub shaft has a flat surface 29 against which a detent 30 is urged by spring 32, the spring and detent being suitably retained in a hollow screw stud 33 and serving to resist accidental rotation of the shaft away from the position in which it is shown. Axial movement of the shaft is prevented by screw 34 which extends into the annular groove 36.

At the upper end of shaft 20 there is a fork 38 straddling sleeve 40 and hingedly supporting same by means of screws 42. The sleeve in turn rotatably supports an arm 44 having rigid lateral extensions 46 adjacent the sleeve and an upright handle 48 at its end. A shoulder 50 abutting one end of the sleeve and nuts 52 threaded to the arm so they abut the other end limit the endwise play of the arm in the sleeve. It will be seen that sleeve 40, rotary shaft 20 and the pivotal connection therebetween form a universal joint between arm 44 and tube 15 permitting the arm to swing in any direction relative the upper end of the tube.

Within the hollow trunnions 17 are shafts 54 each having a pair of cranks 56 and 58 pinned thereto. Referring to Fig. 3 it will be seen that the left-hand crank 56 is connected to the left-hand arm extension 46 by a tie rod 60, the connection at each end of the tie rod being in the form of a ball and socket joint 62 in order to permit limited universal movement between the connected members. A similar linkage joins the right-hand arm extension 46 with the right-hand crank 56.

The left-hand crank 58 serves to operate control lever 11 while the right-hand crank 58 operates lever 13. The linkage in each case comprises an L-shaped arm 64 having one end clamped to the control lever by a bracket or yoke 66; the other end of the arm is hinged to a push rod 68 which in turn is hinged at its lower end to crank 58. The upper portion of the push rod is loosely encircled by a stationary guide eye 70 carried by an arm extending rearwardly from the under side of the control panel 10.

A crank arm 72 is secured by a screw 74 to the hollow trunnion extending laterally from one end of rocker 16 whereby the crank turns with the main column 15 as it is moved forward and backward. This through the medium of push rod 76 and arm 78 moves control lever 14 forward and backward, it being understood that arm 78 is clamped to the control lever by a yoke 80 and that the push rod is hinged at its ends to the arm and crank respectively.

Lever 12 is operated by a cable 82 which extends around the large pulley 28 and small pulley 84 with its ends secured to the lever.

As best seen in Fig. 6, spring biased detents 86 and 88 cooperate with flat surfaces on shaft 54 and trunnion 17 to resist accidental rotation thereof away from the position in which they are shown. The spring and detent in each case is suitably retained in a hollow screw stud 90 threaded into the support 18.

Referring to Figs. 7 to 10 inclusive, the various control movements of my device now will be explained. Fig. 7 shows the main column 15 pivoted forward from its normal (i. e., dotted) position with no change in the inclination of arm 44, and it will be plain that this turns crank 72 counterclockwise and thus advances lever 14. A rearward movement of the main column obviously will tilt the lever 14 to the rear of its upright or neutral position in similar fashion. It will be observed that the forward and backward movement of the main column brings about a change in the angular relationship between shafts 20 and 24 at the universal joint 22, this joint being aligned with the axis of trunnions 17 in order to accommodate the change.

Fig. 8 indicates how a downward displacement of arm 44 turns cranks 56 and 58 clockwise and hence moves the control levers 11 and 13 forward in unison, while an upward displacement of the arm moves them rearwardly. It will be observed that control levers 11 and 13 are nowise affected by the movement illustrated in Fig. 7 because the inclination of arm 44 is not changed; by the same token control levers 12 and 14 are nowise affected by the type of movement shown in Fig. 8, assuming that the normal position of column 15 and shaft 20 is not disturbed.

If desired, at the same time arm 44 is moved up or down as indicated in Fig. 8 column 15 may be pushed forward or backward as in Fig. 7, in which case lever 14 will be moved along with levers 11 and 13. The direction in which lever 14 is moved may be the same as the direction in which levers 11 and 13 are moved or it may be opposite thereto; for example, assuming the mechanism to be positioned as shown by solid lines in Fig. 8 (i. e., with control levers 11 and 13 forward) it will be seen that column 15 may be moved forward or backward to adjust lever 14 without in any way disturbing the position of levers 11 and 13. The same would be true if arm 44 were in the position indicated by dotted lines in Fig. 8.

Figures 9, 10:
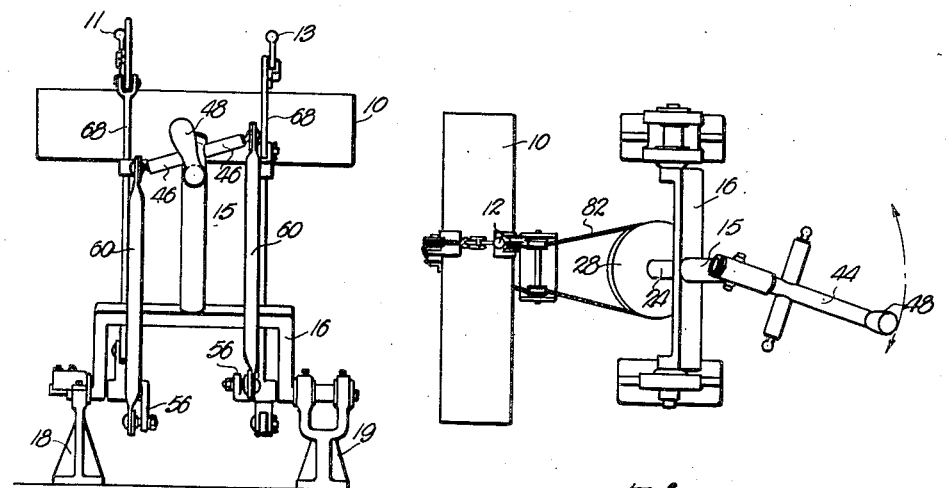

When it is desired to move control levers 11 and 13 not in the same direction but in opposite directions, this may be accomplished by twisting handle 48 as shown in Fig. 9, which tilts extensions 46 with respect to the horizontal and thus turns the right- and left-hand cranks 56 in opposite directions. The left-hand push rod 68 is moved upwardly while the right-hand one is moved downwardly (or vice versa, depending upon the direction that handle 48 is twisted) with a result that levers 11 and 13 are moved in opposite directions.

In the event it is desired to move only one of the control levers 11 and 13 the twisting of handle 48 is accompanied by a raising or lowering of arm 44 whereby one of the tie rods 60 remains stationary while the other moves up or down to perform the desired operation. For example, referring to Fig. 9 it will be apparent that without moving the right-hand tie rod 60 the left-hand tie rod can be raised (and lever 11 hence drawn rearwardly) by turning handle 48 clockwise and at the same time lifting the handle. Similarly, the left-hand rod 60 could be maintained stationary while the right-hand rod is lowered simply by turning handle 48 clockwise and at the same time depressing it.

Twisting of the handle as just described, either with or without a vertical movement of the handle, can be combined with a forward or backward movement of column 15 in order to bring about a change in the position of control lever 14 as already explained in connection with Figs. 7 and 8.

As can readily be seen from Fig. 10, swinging of the arm 44 in the arc about the main column 15 as a center turns the pulley 28, and through the medium of cable 82 moves control lever 12 backward or forward depending upon the direction of rotation. Universal joint 22 permits this movement even though shafts 20 and 24 are not in alignment, and the control of lever 12 may be combined with any or all of the control movements hereinbefore described.

The restoration of any one of the control levers 11 to 14 to its neutral or vertical position after it has been displaced is facilitated by one of the spring biased detents 30, 86 or 88 which serves automatically to index or define the home position of the portion of my mechanism which actuates the control lever in question. As indicated previously, the detents also serve to prevent unintended displacement of various parts of the mechanism from their respective home positions.

It has been suggested that levers 11 to 14 may be control levers on road grading machinery but this is not intended to be restrictive, inasmuch as they obviously may be the controls on other types of apparatus. The control exercised by these levers may be accomplished through direct mechanical linkages, through relay systems of the electrical, hydraulic or pneumatic types or through any other suitable form of power booster. Since many possible applications and embodiments of the invention may be made without departing from the scope thereof it is to be understood that all matter herein set forth or shown in the accompanying drawings is to be interpreted as illustrative and not in a limiting sense.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Having thus described my invention, I claim:

1. In combination with a plurality of devices to be controlled, a pivotal lever, mechanism connecting the lever to one of said devices and actuated by a movement of the lever about its pivot for operating said one device, a second lever pivoted to said first lever at a point removed from said first lever's pivot, mechanism connecting the second lever to a second one of said devices, said last mechanism actuated by a movement of said second lever about its pivot relative to said first lever for operating said second device, and yieldable means resisting movement of said second lever away from a predetermined position.

2. In combination with a plurality of devices to be controlled, a pivotal lever, mechanism connecting the lever to one of said devices and actuated by a movement of the lever about its pivot for operating said one device, a second lever pivoted to said first lever for rotation about the longitudinal axis of said first lever and mechanism connecting said second lever to a second one of said devices, said last mechanism actuated by rotation of said second lever about the longitudinal axis of said first lever for operating said second device, and yieldable means resisting rotation of said second lever away from a predetermined position.

3. In combination with a plurality of devices to be controlled, a pivotal lever, mechanism connecting the lever to one of said devices and actuated by a movement of the lever about its pivot for operating said one device, a second lever transverse to said first lever and having one end connected by a universal joint to said first lever at a point spaced from said first lever's pivot, manually engageable means on the other end of said second lever for moving same, mechanism operated by a lateral swinging movement of said second lever about the longitudinal axis of said first lever for actuating a second one of said devices, and other mechanism operated by movement of said second lever in a plane common to the longitudinal axes of said two levers for actuating a third one of said devices.

4. A combination as in claim 3 wherein said second lever is so supported that it is rotatable about its own longitudinal axis, said last-named mechanism operated by rotation thereof about its own axis for actuating said third device.

5. In combination with a plurality of devices to be controlled, a pivotal lever, mechanism connecting the lever to one of said devices and actuated by a movement of the lever about its pivot for operating said one device, a second lever pivoted to said first lever at a point spaced from said first lever's pivot whereby the angular relationship of said two levers may be changed, means supporting said second lever so it is rotatable about its own longitudinal axis, and mechanism connected to said second lever for operating a second one of said devices responsive either to rotation of said second lever about its own longitudinal axis or pivotal movement of the second lever which changes the angular relationship of said two levers.

6. In combination with a plurality of devices to be controlled, a pivotal lever, a second lever pivoted to said first lever at a point spaced from said first lever's pivot whereby the angular relationship of said two levers may change, means supporting said second lever so it is rotatable about its own longitudinal axis, mechanism connecting said second lever to a pair of said devices for operating them in opposite directions responsive to rotation of said second lever about its own longitudinal axis and operating them in the same direction responsive to pivotal movement of said second lever which changes the angular relationship of the two levers, and other mechanism connecting said first lever to a third one of said devices and actuated by a movement of said first lever about its pivot for operating said third device.

7. In combination with a plurality of devices to be controlled, a lever mounted for rotation about its longitudinal axis and for pivotal movement about an axis transverse to its longitudinal axis, a second lever, means supporting said second lever on said first lever at a point removed from said transverse axis, said supporting means adapted to permit rotation of said second lever about its own longitudinal axis and pivotal movement thereof about an axis normal to the longitudinal axes of both levers, and mechanism connecting said levers to said devices to operate the devices selectively responsive to movements of the levers about different ones of said axes.

8. Apparatus of the character described, comprising a U-shaped rocker pivoted at its ends and having fixed thereto a hollow tube whose axis is normal to the axis of rotation of the rocker, a rotary shaft in the tube connected to a second shaft by a universal joint located at the axis of rotation of the rocker, a mounting for said second shaft permitting rotation thereof but maintaining the axis of said second shaft in a predetermined position, mechanism connected to said rocker and operated by movement thereof about its pivotal axis, yieldable means resisting pivotal movement of said rocker away from a predetermined position, and other mechanism connected to said second shaft and operated by rotation thereof.

9. Apparatus of the character described, comprising a U-shaped rocker pivoted at its ends and having fixed thereto a hollow tube whose axis is normal to the axis of rotation of the rocker, a rotary shaft in the tube connected to a second shaft by a universal joint located at the axis of rotation of the rocker, a mounting for said second shaft permitting rotation thereof but maintaining the axis of the second shaft in a predetermined position, mechanism connected to said rocker and operated by movement thereof about its pivotal axis, and yieldable means resisting rotation of said second shaft away from a predetermined position.

10. Apparatus of the character described comprising a pivotal lever, a sleeve hinged to the lever at a point removed from its pivot, a shaft supported by said sleeve, a handle on said shaft for manually rotating same in said sleeve, swinging the sleeve relative to the lever or moving the lever about its pivot at will, a pair of cranks mounted for rotation about the same axis as said lever, lateral extensions on said shaft, tie rods between said extensions and said cranks whereby said cranks are turned in opposite directions when said shaft is rotated in said sleeve and are turned in the same direction when the sleeve is pivoted relative to said lever, separate mechanisms connected to and operated by each crank; and a further mechanism connected to and operated by the lever responsive to a pivotal movement thereof.

11. Apparatus as in claim 10 having yieldable means resisting the movement of each crank away from a predetermined position.

12. Apparatus as in claim 10 having yieldable means resisting the movement of said lever away from a predetermined position.

13. In combination with a plurality of devices to be controlled, a lever mounted for rotation about its longitudinal axis and for pivotal movement in an arc about either of two axes transverse to its longitudinal axis, mechanism connecting said lever to a pair of said devices for operating them in opposite directions responsive to rotation of said lever about its longitudinal axis and operating them in the same direction responsive to pivotal movement of the lever about one of said transverse axes, and mechanism connecting said lever to another of said devices for operating the latter responsive to pivotal movement of the lever about the other transverse axis.

14. Apparatus of the character described, comprising a U-shaped rocker pivoted at its ends and having fixed thereto a hollow tube whose axis is normal to the axis of rotation of the rocker, a rotary shaft in the tube connected to a second shaft by a universal joint located at the axis of rotation of the rocker, a mounting for said second shaft permitting rotation thereof but maintaining the axis of said second shaft in a predetermined position, a lever hingedly connected to said first shaft at a point spaced away from the universal joint, manually engageable means on said lever for optionally pivoting same at its hinge, rotating said first shaft in its tube or rocking said rocker as desired, mechanism connected to said lever and operated by said pivotal movement thereof on its hinge, other mechanism connected to said second shaft and operated by rotation thereof, and still other mechanism connected to said rocker and operated by movement thereof about its pivotal axis.

15. Apparatus of the character described, comprising a U-shaped rocker pivoted at its ends and having fixed thereto a hollow tube whose axis is normal to the axis of rotation of the rocker, a rotary shaft in the tube connected to a second shaft by a universal joint located at the axis of rotation of the rocker, a mounting for said second shaft permitting rotation thereof but maintaining the axis of said second shaft in a predetermined position, a sleeve hingedly connected to said first shaft at a point spaced away from the universal joint, said sleeve having a coaxial shaft rotatably supported therein.

16. Apparatus of the character described, comprising a U-shaped rocker pivoted at its ends and having fixed thereto a hollow tube whose axis is normal to the axis of rotation of the rocker, a rotary shaft in the tube connected to a second shaft by a universal joint located at the axis of rotation of the rocker, a mounting for said second shaft permitting rotation thereof but maintaining the axis of said second shaft in a predetermined position, a sleeve hingedly connected to said first shaft at a point spaced away from the universal joint, said sleeve having a coaxial shaft rotatably supported therein, mechanism connected to said rocker and operated by movement thereof about its pivotal axis, other mechanism connected to said second shaft and operated by rotation thereof, and a pair of devices connected to said coaxial shaft operated in the same direction responsive to pivotal movement of said sleeve at its hinge and in opposite directions responsive to rotation of said coaxial shaft in said sleeve.

BERNARD H. HESEMANN.

REFERENCES CITED

The following references are of record in the file of this patent:

UNITED STATES PATENTS

| Number | Name | Date |
|---|---|---|
| 1,297,999 | Bryant | Mar. 25, 1919 |
| 1,694,477 | Long | Dec. 11, 1928 |
| 1,807,848 | Kollinek | June 2, 1931 |
| 1,855,988 | Ranasey | Apr. 26, 1932 |
| 2,082,410 | McCauley | June 1, 1937 |
| 2,144,616 | Carlson | Jan. 24, 1939 |
| 2,257,852 | Nicol | Oct. 7, 1941 |
| 2,396,309 | Wodal | Mar. 12, 1946 |
| 2,407,322 | Morrison | Sept. 10, 1946 |
| 2,413,577 | Osborn | Dec. 31, 1946 |
| 2,461,194 | Beetle, Jr. | Feb. 8, 1949 |

FOREIGN PATENTS

| Number | Country | Date |
|---|---|---|
| 620,519 | France | Apr. 25, 1927 |